Patented Aug. 28, 1928.

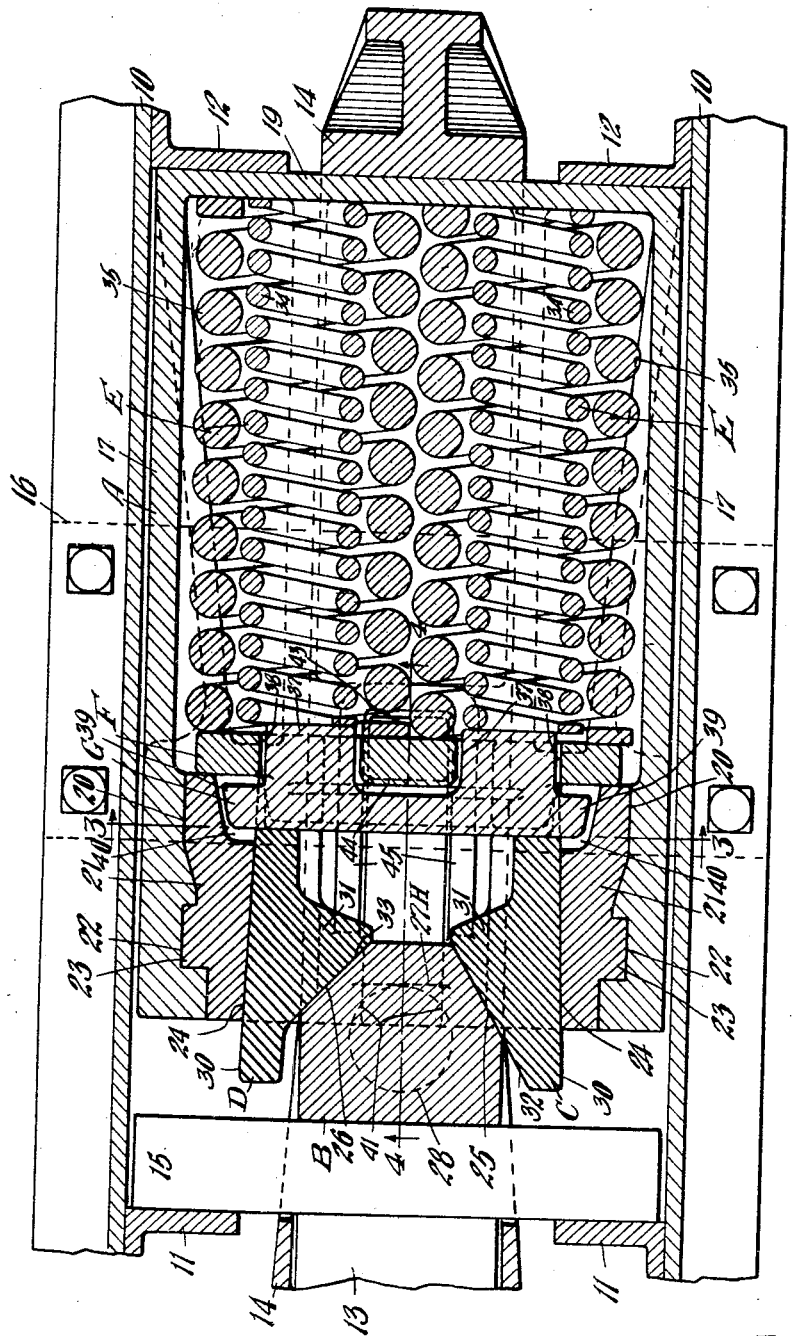

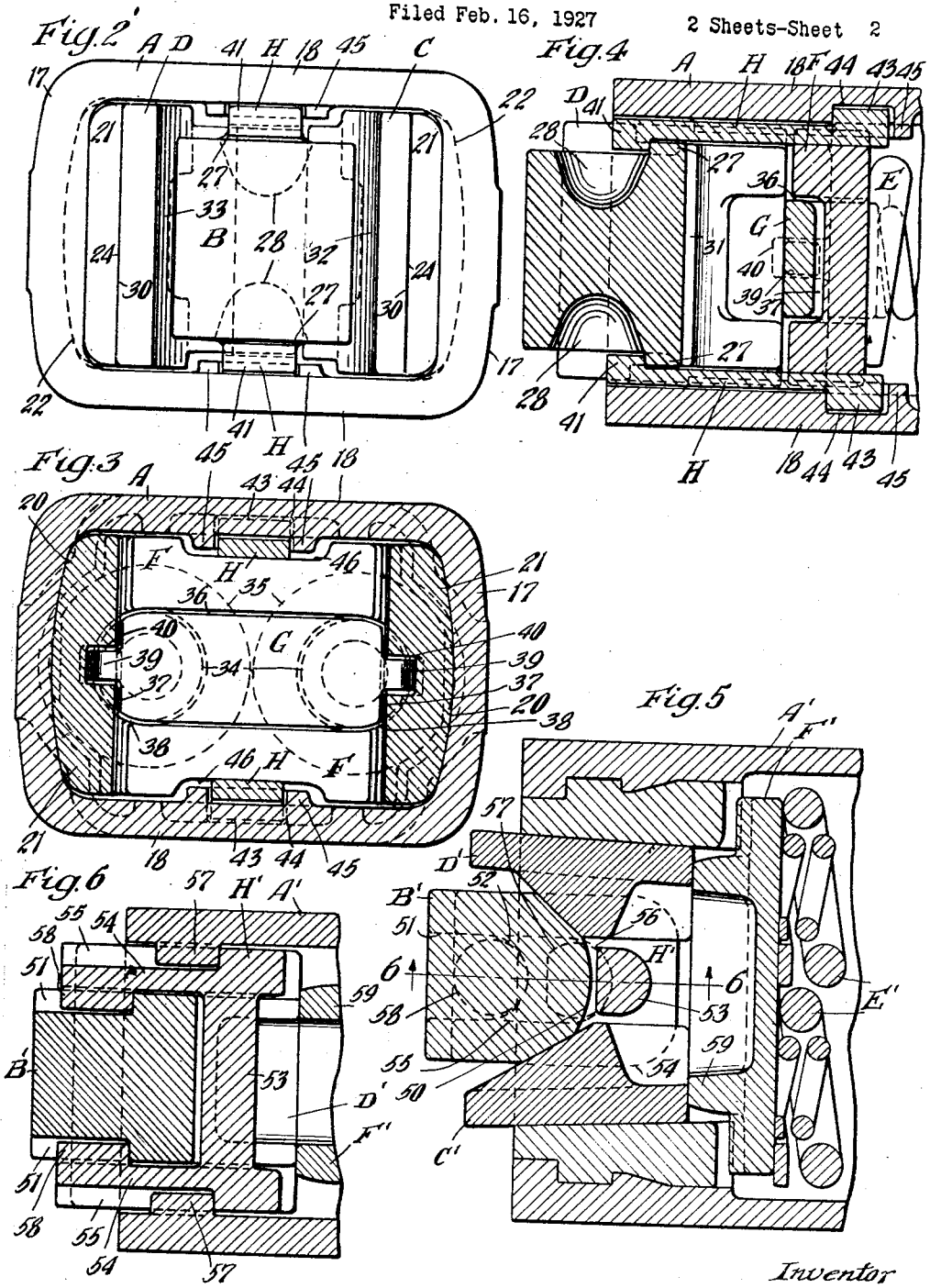

1,682,043

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 16, 1927. Serial No. 168,558.

This invention relates to improvements in friction shock absorbing mechanisms.

One object of the invention is to provide a friction shock absorbing mechanism especially adapted for railway draft riggings, including spring resisted friction elements having pressure transmitting spreading means co-operating therewith, wherein durable, simple and efficient means is provided for anchoring the pressure transmitting means to hold the same assembled with the mechanism.

A further object of the invention is to provide a mechanism of the character indicated, including friction elements and a co-operating wedge member, wherein anchoring means of exceptional strength is provided for holding the wedge assembled with the other parts of the mechanism and wherein the anchoring means is readily detachable.

Another object of the invention is to provide a friction shock absorbing mechanism of the character indicated, including a friction shell, friction shoes co-operating therewith, and a block having wedging engagement with the shoes, together with means for holding the wedge block assembled with the other parts of the mechanism, including means in the form of heavy bars disposed above and below the wedge block and anchored to the shell and wedge, wherein the bars also serve to hold the wedge out of direct contact with the shell walls, thereby preventing wear of the inactive surfaces of the friction shell.

Still another object of the invention is to provide a friction shock absorbing mechanism, including a combined spring cage and friction shell, friction shoes co-operating with the shell section, wedge means co-operating with the shoes, twin arranged spring resistance means within the shell, each twin means including a relatively light spring resistance element and a heavy element co-operating with independent spring follower means, wherein the spring follower means co-operating with the light spring resistance element alone opposes movement of the friction shoes during the initial compression of the mechanism to set up the wedging action.

Other objects and advantages of the invention will more fully and clearly appear from the description and claims hereinafter following.

In the drawings, forming a part of this specification, Figure 1 is a horizontal longitudinal sectional view of a railway draft rigging, showing one embodiment of my invention in connection therewith. Figure 2 is a front end elevational view of the shock absorbing mechanism proper illustrated in Figure 1. Figure 3 is a vertical, transverse sectional view corresponding substantially to the line 3—3 of Figure 1. Figure 4 is a longitudinal vertical sectional view of the front end of the shock absorbing mechanism illustrated in Figure 1 and corresponding substantially to the line 4—4 of Figure 1. Figure 5 is a horizontal sectional view of the front end of a shock absorbing mechanism illustrating another embodiment of my invention. And Figure 6 is a longitudinal vertical sectional view corresponding substantially to the line 6—6 of Figure 5.

In said drawings, 10—10 indicate channel-shaped center or draft sills of a railway car underframe to the inner faces of which are secured front stop lugs 11—11 and rear stop lugs 12—12. The inner end portion of the drawbar is indicated by 13, to which is operatively connected a yoke 14 of well known form. The shock absorbing mechanism proper and front main follower 15 are disposed within the yoke, and the yoke and the parts therewithin are supported in operative position by a detachable saddle plate 16 fixed to the draft sills.

Referring first to the embodiment of the invention illustrated in Figures 1 to 4, inclusive, my improved shock absorbing mechanism comprises broadly: A combined friction shell and spring cage A; a main wedge B; a pair of friction shoes C and D; twin arranged main spring resistance elements E—E; a main spring follower F; an auxiliary spring follower G; and a pair of wedge retaining members H—H.

The combined friction shell and spring cage is in the form of a box-like casting having longitudinally disposed, spaced vertical side walls 17—17; longitudinally disposed spaced horizontal top and bottom walls 18—18; and a vertical end wall 19. The end wall 19 co-operates with the rear stop lugs 12 in the manner of the usual rear follower. The side walls 17 are thickened at the forward end of the casting to provide the friction shell section thereof. The thickened portions of the side walls are interiorly cut away as indicated at 20—20 of Figure 3 to permit insertion of the twin springs through the front end of the casing. Detachable liners 21—21 are mounted on each side wall of the friction shell, the side walls being grooved as indicated at 22 to receive projecting portions 23 of the liners to interlock the liners with the side walls of the shell against longitudinal displacement. On the inner sides, the liners 21 are provided with longitudinally extending flat friction surfaces 24—24 converging inwardly of the mechanism.

The wedge B is in the form of a solid block having a flat front end face bearing directly on the inner side of the main follower 15. At the inner end, the wedge is provided with a pair of inwardly converging wedge faces 25 and 26, the wedge face 25 being disposed at a relatively keen wedge acting angle with respect to the axis of the mechanism and the wedge face 26 being disposed at a relatively blunt releasing angle with respect to said axis. At the top and bottom sides, the wedge block B is provided with projecting rectangular lugs 27 adapted to co-operate with lugs on the retainer member H. As clearly shown in Figure 4, the upper and lower faces of the wedge block are recessed as indicated at 28.

The friction shoes C and D are disposed at opposite sides of the wedge block B and co-operate with the liners 21. The friction shoes C and D are of similar design except as hereinafter pointed out. Each shoe is provided with a longitudinally disposed outer flat friction surface 30 adapted to co-operate with the friction surface 24 of the corresponding liner. On the inner side, each shoe is provided with a lateral enlargement 31 having a wedge face at the forward side thereof, the wedge face of the block C being designated by 32 and co-operating with the wedge face 25 of the wedge block B and correspondingly inclined thereto and the wedge face of the shoe D is designated by 33 and co-operates with the wedge face 26 of the block B and is correspondingly inclined thereto. Although the co-operating wedge faces of the friction shoes and wedge block B are herein illustrated as disposed at different angles with respect to the longitudinal axis of the mechanism, it will be evident that it is within my invention to dispose these wedge faces at the same angle with respect to said axis.

The twin arranged spring resistance elements E each comprise an inner relatively light coil 34 and an outer heavier coil 35. Both of these coils have the inner ends thereof bearing on the end wall 19 of the spring cage.

The main spring follower F is in the form of a relatively heavy rectangular plate and is interposed between the coils 35 of the twin springs and the inner ends of the friction shoes and in the normal full release position of the mechanism bears directly on the inner ends of the liners 21. At the forward side, the spring follower F is centrally cut away as indicated at 36 to receive the auxiliary spring follower G. The auxiliary spring follower G has a main body portion in the form of a relatively heavy bar provided with rearwardly extending spaced partially cylindrical bosses or projections 37 adapted to extend freely through openings 38 provided in the main spring follower F and bear directly on the front ends of the inner coils 34 of the twin spring resistance elements.

The auxiliary spring follower G is also provided with a pair of laterally projecting lugs 39 working in recesses 40 of the liners, and adapted to engage the spring follower F after preliminary compression of the mechanism. As most clearly shown in Figure 1, the body portion of the auxiliary spring follower G is normally held in spaced relation with respect to the main spring follower F by the coils 34 of the spring resistance elements. The auxiliary spring follower G bears directly on the inner ends of the friction shoes C and D. It will be evident that by this arrangement, the inward movement of the friction shoes C and D is initially resisted by the inner coils 34 of the spring resistance elements, thereby setting up the wedging action.

The retaining elements H are in the form of elongated flat bars disposed above and below the wedge block B. Each of the bars H is provided with a rectangular lug 41 at the forward end thereof, engaging in front of the corresponding lug 27 of the wedge block. At the rear end, each bar H is provided with a rectangular lug 43 seated within a socket 44 on the corresponding wall 18 of the friction shell section of the combined friction shell and spring cage. As will be evident, the retaining bars H through their lug connection with the walls of the friction shell and with the lugs of the wedge B serve to hold the wedge assembled with the other parts of the shock absorbing mechanism and provide a lost motion connection between the wedge and the friction shell to permit inward movement of the wedge during the compression stroke of the mechanism. As most clearly shown in Figures 3 and 4, the top and bottom walls 18 of the friction shell are provided with spaced inwardly projecting ribs 45 disposed at opposite sides of the bars H, thus providing longitudinal guides therefor. The main spring follower F is also centrally slotted as indicated at 46 to accommodate the bars H, and the ends of the enlargements 31 of the shoes are notched out, as indicated in Figure 2 to provide clearance for the guide ribs 45.

In assembling the mechanism, the main springs are inserted within the combined spring cage and friction shell, the retaining elements H placed in position, and the main spring follower F and auxiliary spring follower G inserted between the retaining elements H. The assembled parts are then placed under compression and the liners positioned within the friction shell. The friction shoes are then inserted and the parts compressed until the wedge may be inserted, the lugs 27 clearing the lugs 41 on the retaining elements H. When the lugs 27 have been engaged behind the lugs 41, the pressure is released and the parts assume the normal position indicated in Figures 1 and 4. When the parts are assembled, the main springs are preferably placed under an initial compression. Due to this initial compression, the springs 34 urge the spring follower and friction shoes outwardly, thereby compensating for wear of the various friction and wedge faces.

The operation of my improved shock absorbing mechanism, as illustrated in Figures 1 to 4, inclusive, assuming a compression stroke, is as follows: The main follower 15 and the combined spring cage and friction shell B will be moved relatively toward each other, thereby forcing the wedge block B inwardly of the shell and spreading the shoes C and D which are resisted in their movement by the springs 34 through the medium of the interposed auxiliary spring follower G. A wedging action will thus be set up, forcing the shoes into tight frictional engagement with the friction surfaces of the shell. Upon further compression of the mechanism, the spring follower G will be carried inwardly a sufficient distance to take up the clearance between the same and the main spring follower F, whereupon the two spring followers will move in unison and effect compression of both coils of the twin arranged springs during the remainder of the compression stroke. This action will continue either until the actuating force is reduced or the main follower 15 comes into engagement with the outer end of the combined friction shell and spring cage A, whereupon the actuating force will be transmitted directly through the combined friction shell and spring cage, the latter acting as a solid column load transmitting member to prevent the main springs from being unduly compressed.

When the actuating force is reduced, during release of the mechanism, the spring resistance elements E will carry the main spring follower F and the auxiliary spring follower G outwardly, forcing the friction shoes and wedge block outwardly also. Movement of the main spring follower F will be limited by engagement with the inner ends of the liners 21 and movement of the friction shoes and the auxiliary spring follower G will be limited by engagement of the wedge with the lugs 41 of the retaining elements H.

Referring next to the embodiment of the invention illustrated in Figures 5 and 6, the same comprises broadly: a combined friction shell and spring cage A'; a main wedge B'; a pair of friction shoes C' and D'; twin arranged main spring resistance elements E'; a main spring follower F' and a wedge retaining member H'.

The combined friction shell and spring cage A', the friction shoes C' and D' and the main spring resistance elements E' are of similar design with the corresponding elements described in connection with Figures 1 to 4, inclusive. The wedge block B' is of similar construction to the wedge block B hereinbefore described, differing therefrom only in that it has a rounded inner end 50, and is provided with top and bottom slots 51—51 extending inwardly from the front end thereof and terminating short of the rear end. The inner end walls of the slots 51 are curved as clearly indicated at 52 in Figure 5.

The retaining element H' is in the form of a yoke shaped member having a vertically extending section 53 and top and bottom arms 54—54 forwardly projecting therefrom, and embracing the wedge block B'. The top and bottom arms are provided with longitudinally extending top and bottom slots 55 having inner rounded end walls 56. The slots 55 are adapted to receive top and bottom lugs 57 formed integral with the top and bottom walls of the friction shell. The lugs 57 are provided with rounded inner ends which cooperate with the curved end walls 56 of the slots. At the outer ends, the arms 54 are provided with inwardly extending lugs 58 engaging within the slots 51 of the wedge block B', having curved inner end faces co-operating with the curved end walls of the slots 51 to limit outward movement of the wedge block B'. As most clearly shown in Figure 5, the top and bottom arms 54 are considerably wider than the vertical connecting section 53, being in the form of relatively wide plate-like members. It will be evident that the arms 54 thus present relatively wide bearing surfaces which engage with the corresponding walls of the friction shell, thereby reducing wear.

The main spring follower F' is interposed directly between the inner ends of the friction shoes C' and D' and the main spring resistance elements E'. As shown, the spring follower F' is in the form of a substantially rectangular plate having forwardly projecting flanges 59 engaging the inner ends of the friction shoes.

In assembling the mechanism, illustrated in Figures 5 and 6, the retaining element H' is inserted before assembling the friction shoes with the friction shell, the front end of the retaining element being entered first so that the lugs 57 of the shell will enter the open ends of the slots 55. The retaining element is then revolved while further entering the same until it assumes the position shown in Figures 5 and 6. After the retaining element H' has been placed in position, the friction shoes are inserted and the wedge block is assembled with the mechanism in a manner similar to the retaining element H'. When assembled, the lugs 58 engaging within the slots 51, will hold the wedge locked to the retaining element H and the parts will be maintained interlocked by the expansive action of the main springs E'.

The operation of the improved shock absorbing mechanism shown in Figures 5 and 6 is substantially the same as the operation of the device disclosed in Figures 1 to 4, inclusive, hereinbefore described, with the exception that the wedge friction shoes bear directly on the main spring follower F', thus causing compression of the entire spring resistance E' at the beginning of the compression stroke and throughout the operation of the gear, the initial compression of the entire spring resistance being thus utilized to provide compensation for wear.

From the preceding description taken in connection with the drawings, it will be evident that I have provided durable, simple and efficient means for retaining the wedge member of a friction shock absorbing mechanism assembled with the remaining elements of the same. Further, by providing top and bottom retaining members which are interposed between the wedge block and the top and bottom walls of the friction shell, contact of the wedge block with these shell walls is prevented and wear of the same practically eliminated, the retaining members or bars acting substantially as wear plates.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction shell; friction shoes cooperating therewith; spring resistance means opposing movement of the shoes; a wedge engaging the shoes; and means for holding the wedge assembled with the shell, including retaining means providing a lost motion connection, said retaining means being separate from and embracing the wedge and detachably anchored to the wedge and shell.

2. In a friction shock absorbing mechanism, the combination with a friction shell having top, bottom and side walls, said side walls being provided with longitudinally disposed friction surfaces; friction shoes co-operating with the friction surfaces of the shell; spring resistance means opposing movement of the shoes; means for anchoring the wedge to the shell, including arm members disposed above and below said wedge; and stop means on said arm members engaging abutment faces on the shell and wedge to limit outward movement of the wedge and hold the same assembled with the shell.

3. In a friction shock absorbing mechanism, the combination with a friction shell having top, bottom and side walls; of friction shoes co-operating with two opposed walls of the shell; spring resistance means opposing movement of the shoes; a wedge engaging the shoes; and means interposed between the wedge and one of the walls of the shell for anchoring the wedge to the shell.

4. In a friction shock absorbing mechanism, the combination with a friction shell provided with interior friction surfaces; friction shoes co-operating with the friction surfaces; spring resistance means opposing movement of the shoes; a wedge block engaging the shoes; and a retaining element connected to the wedge block and shell to provide a lost motion connection, said retaining means being interposed between the wedge block and a wall section of the shell.

5. In a friction shock absorbing mechanism, the combination with a combined spring cage and friction shell, said friction shell having top, bottom and side walls, two opposed walls of the shell being provided with friction surfaces; friction shoes co-operating with the friction surfaces; spring means within the combined cage and friction shell opposing movement of the shoes; a wedge cooperating with the shoes; and retaining means for the wedge anchored to the friction shell and wedge, said retaining means comprising members disposed on the opposite sides of the wedge and interposed between the same and the two remaining walls of the shell.

6. In a friction shock absorbing mechanism, the combination with a rectangular friction shell, having opposed walls thereof provided with friction surfaces, and having the remaining opposed walls provided with abutment means; of friction shoes co-operating with the friction surfaces of the shell; a wedge co-operating with the shoes; retaining members interposed between said wedge and the walls of the shell having the abutment means thereon; said retaining members having abutments co-operating with said abutment means and being anchored to the wedge to provide a lost motion connection between the shell and wedge; and a spring resistance opposing movement of the friction shoes inwardly of the shell.

7. In a friction shock absorbing mechanism, the combination with a rectangular friction shell, said shell having friction surfaces on the opposite side walls thereof; of friction shoes co-operating with said friction surfaces; spring means for yieldingly resisting relative movement between the shoes and shell; a wedge block co-operating with the shoes; and retaining bar elements disposed above and below the wedge block and anchored to the shell walls and having a lost motion connection with the wedge block.

8. In a friction shock absorbing mechanism, the combination with a rectagular friction shell; of friction shoes co-operating with the shell; spring means for yieldingly resisting relative movement btween the shoes and shell; a wedge block co-operating with the shoes; retaining bar elements disposed above and below the wedge and having lugs thereon engaging slots in the wedge, said wedge being provided with shoulders co-operating with said lugs to limit outward movement of the wedge and said bars being anchored to the shell.

9. In a friction shock absorbing mechanism, the combination with a rectangular friction shell having friction surfaces on opposite side walls thereof; of wear plates bearing on the remaining side walls of the shell; friction shoes co-operating with the friction surfaces; spring means for yieldingly resisting relative movement between the shoes and shell; a wedge block co-operating with the shoes; and interposed between the wear plates; and means on the wear plates anchored to the wedge block and shell respectively to provide a lost motion connected between said wedge block and shell.

10. In a friction shock absorbing mechanism, the combination with a combined spring cage and friction shell; of shoes co-operating with the friction shell; a wedge block engaging the shoes; twin arranged spring resistance members within the cage, each of said members including a relatively light spring and a heavier spring; a main spring follower co-operating with said heavier spring; and an auxiliary spring follower co-operating with the lighter springs and bearing directly on the shoes, said auxiliary spring follower being normally spaced from the main spring follower and adapted to engage the latter after a predetermined compression of the mechanism to transmit the actuating force from the shoes to said main spring follower during the latter part of the compression stroke.

In witness that I claim the foregoing I have hereunto subscribed my name this 11th day of February 1927.

STACY B. HASELTINE.